United States Patent Office 2,791,885
Patented May 14, 1957

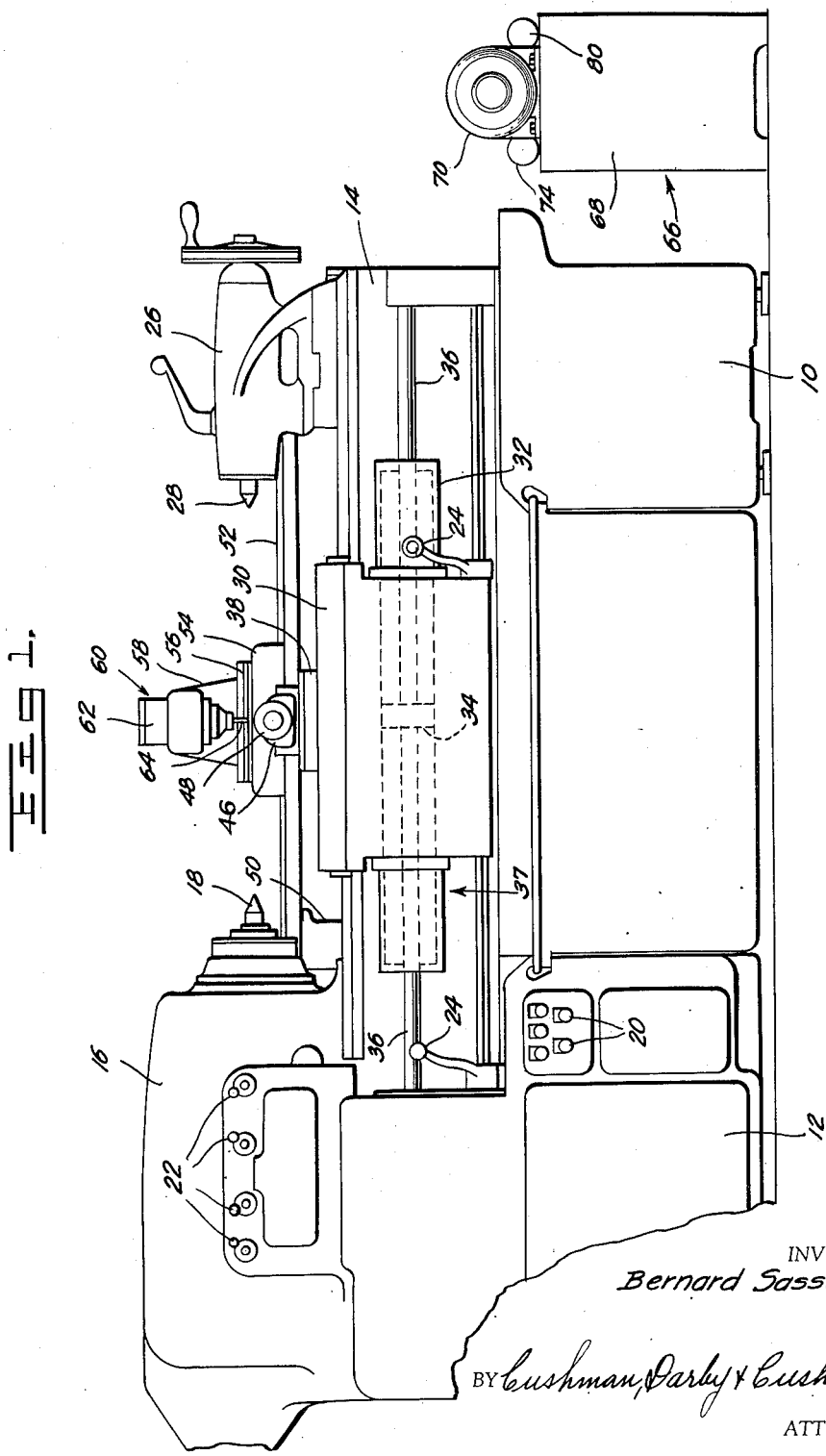

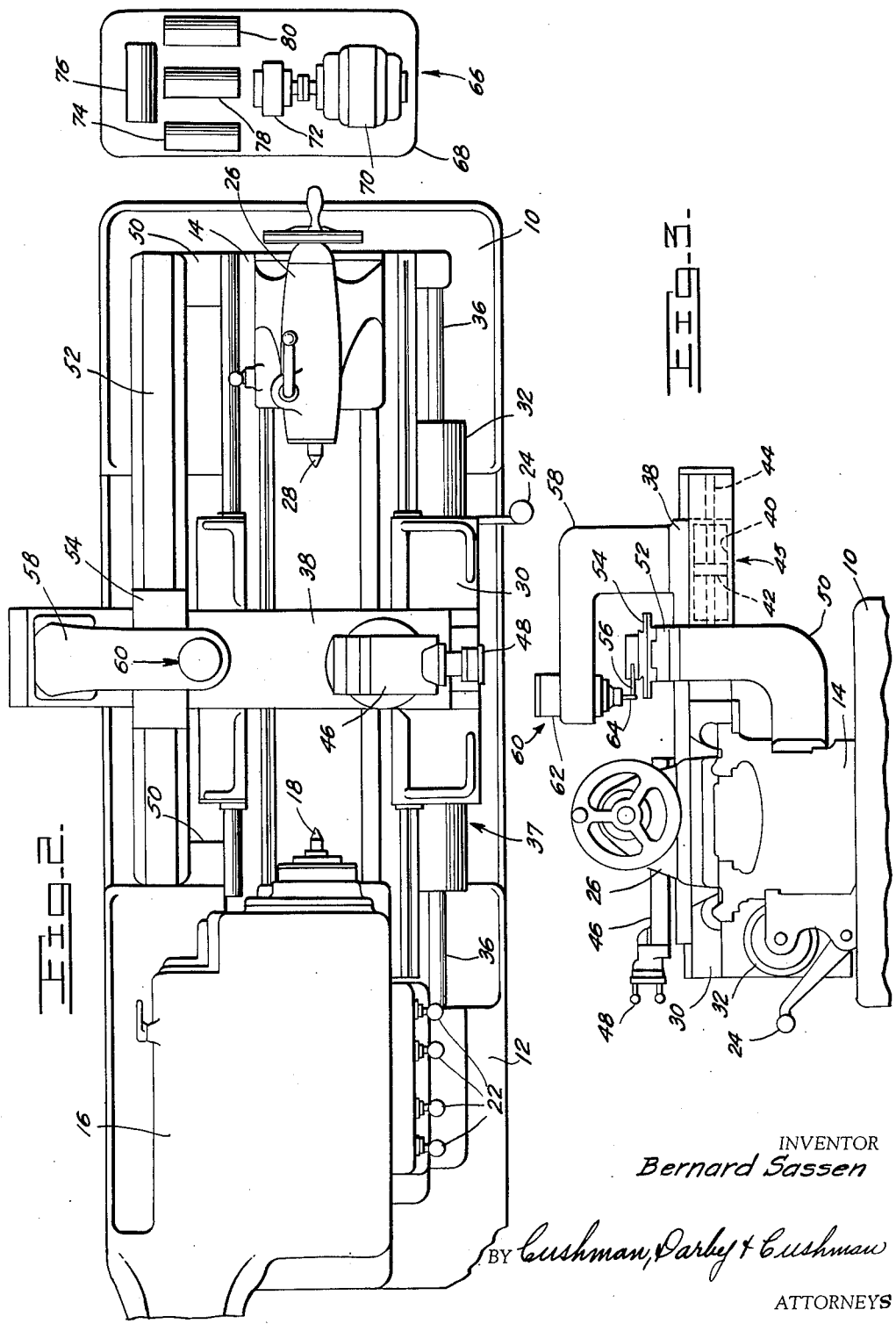

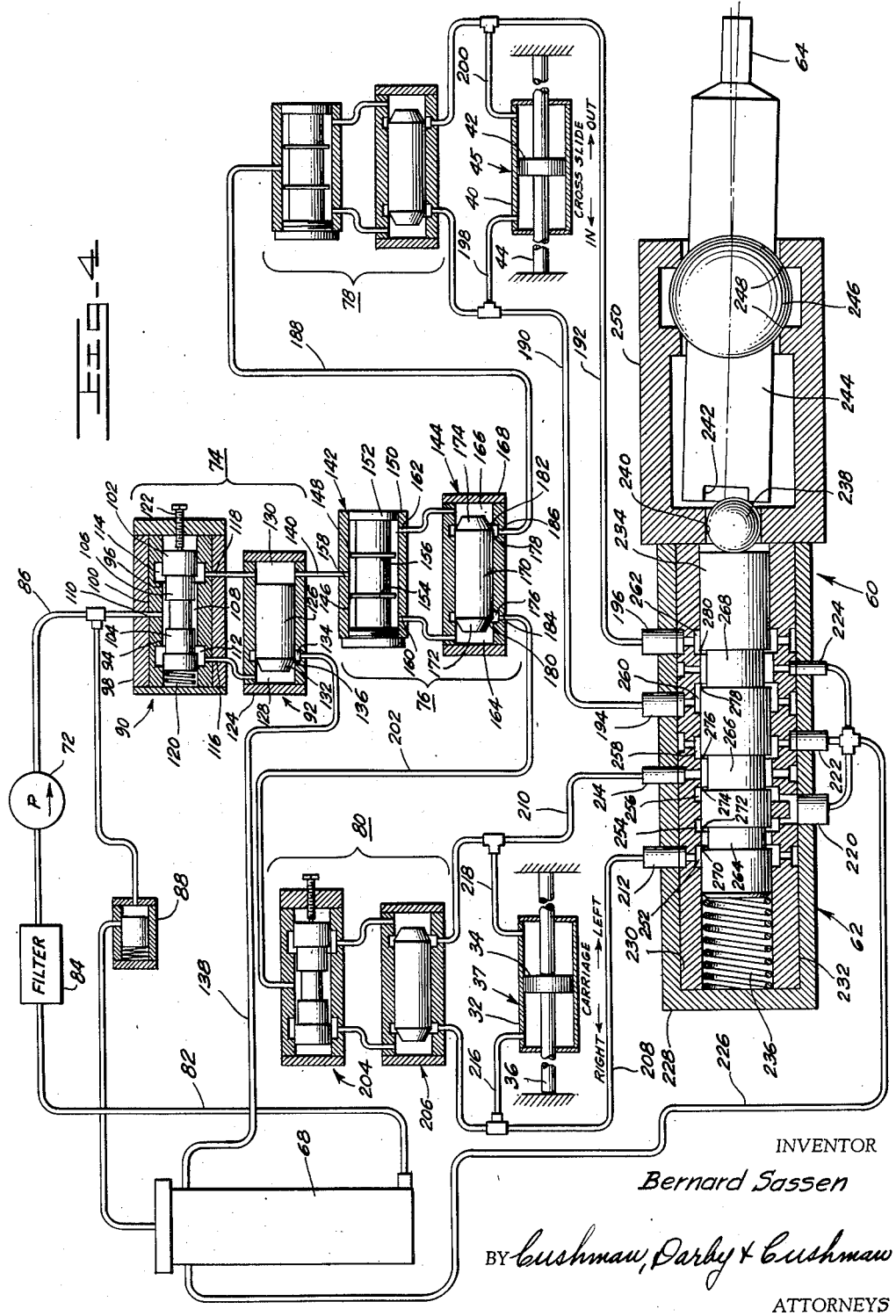

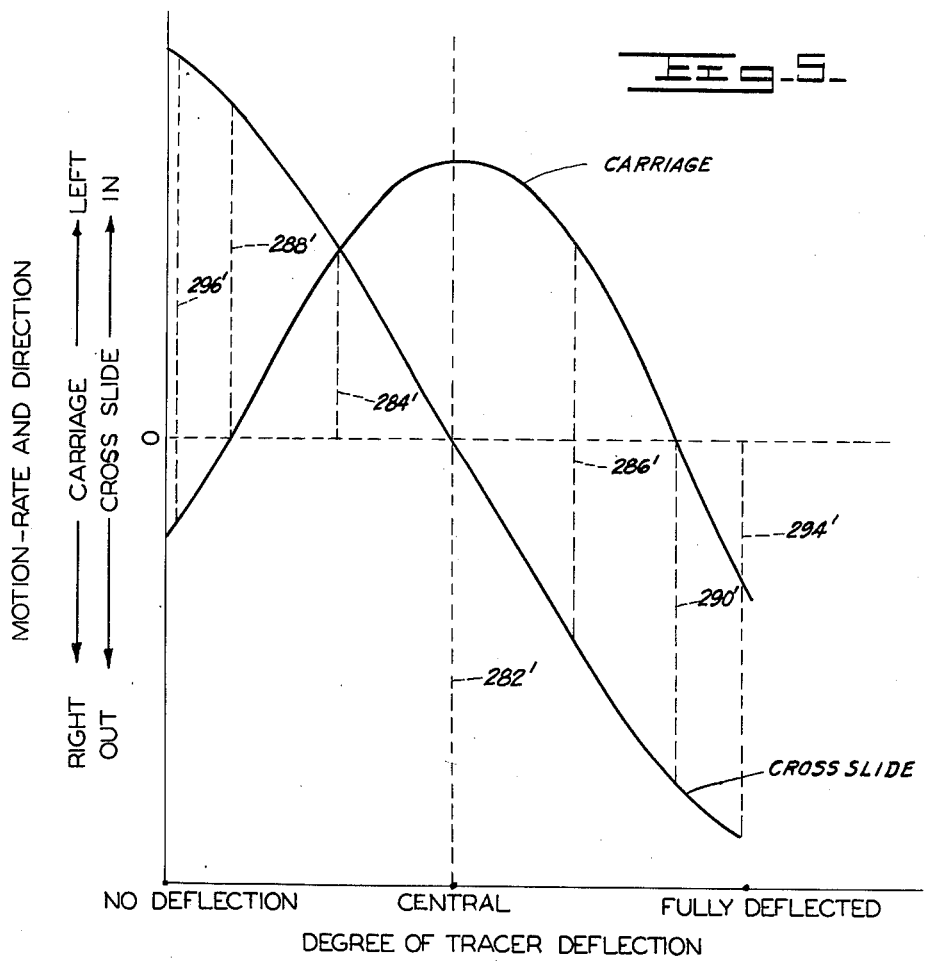
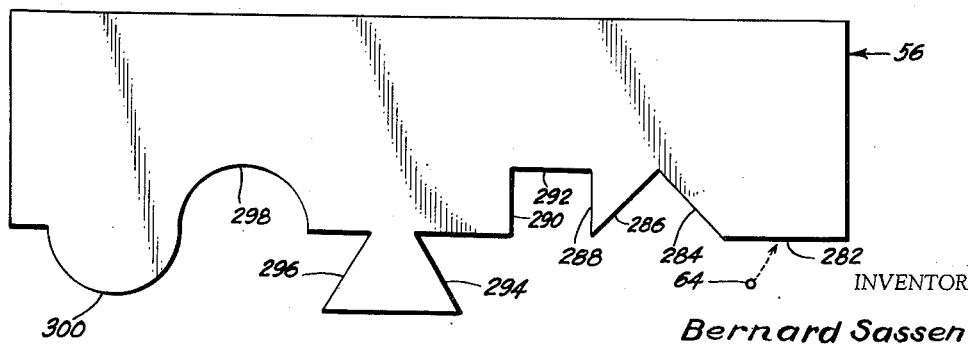
Bernard Sassen

2,791,885

HYDRAULIC TRACER CONTROL

Bernard Sassen, Sidney, Ohio, assignor to The Monarch Machine Tool Co., Sidney, Ohio, a corporation of Ohio Application June 23, 1952, Serial No. 295,086

17 Claims. (Cl. 60—97)

This invention relates to a pattern controlled machine tool, and more particularly to a hydraulic system including a tracer valve for a hydraulically operated pattern controlled machine tool.

Hydraulically operated pattern controlled machine tools are known, but the hydraulic systems of such tools are, in general, extremely complex and include, in addition to a tracer valve, a plurality of distributor valves, reversing valves, and manually adjustable valves, for causing fluid motors to produce relative movement between a tool and the work to shape the latter in accordance with the shape of the pattern. The undue complication and complexity of prior art hydraulic systems render such systems both expensive to manufacture and difficult to service. Further, the hydraulic motors of hydraulically operated pattern controlled machine tools presently in use require a reversal of flow through extended portions of the hydraulic system in order to effect motor reversal. Such flow reversals do not achieve the positive and fine control necessary for accurate shaping of the work by the tool.

Accordingly, it is an object of this invention to provide a comparatively simple and inexpensive hydraulic tracer control for a machine tool, such control being of general application and being capable of functions and results which surpass prior tracer controls of this nature.

It is another object of this invention to provide an improved hydraulic tracer control which can move each of at least two members in either of two opposite directions while maintaining absolute control over the members.

It is another object of this invention to provide a hydraulic system for a hydraulic tracer control which can reverse a fluid motor without reversal of fluid flow through extended portions of the hydraulic system of such tracer control and without the necessity of reversing valves.

It is a further object of this invention to provide an improved tracer valve for use in conjunction with a simplified hydraulic system for controlling a machine tool by a pattern.

Although this invention will be described and illustrated with reference to a pattern controlled lathe, it will be obvious that a hydraulic tracer control embodying this invention will be applicable to other types of machine tools.

Other objects and advantages of the invention will be evident from the following description and accompanying drawings, in which:

Figure 1 is a front elevational view of a pattern controlled lathe embodying this invention.

Figure 2 is a plan view of the lathe shown in Figure 1.

Figure 3 is an end view of the lathe shown in Figure 1, and taken from the right-hand end of the latter figure, but excluding the hydraulic power unit shown therein.

Figure 4 is a schematic view of a hydraulic system embodying this invention and including a longitudinal sectional view of the tracer valve shown in Figure 1.

Figure 5 is a chart illustrating the direction and rate of motion of the two hydraulic motors shown in Figure 1, in accordance with the degree of deflection of the tracer finger.

Figure 6 is a profile view of a template illustrating contours possible to be imparted to the work by a pattern controlled machine tool embodying this invention.

Referring now to Figures 1 through 3 of the drawings, there is shown therein a conventional type of lathe having a tailstock leg 10 and a headstock leg 12. Supported by the legs is a lathe bed 14 having a headstock 16 suitably mounted at one end thereof and provided with a center 18. The headstock 16 is driven by a main drive motor (not shown) enclosed within the leg 12 and controlled by various push buttons 20. The headstock 16 also includes suitable speed changing devices (not shown), such as gears which are adjustable by conventional gear shift handles 22, and a conventional clutch (not shown) which is controlled by the handles 24.

Mounted on the other end of the bed 14 is the usual tailstock 26 having a center 28, which, together with the headstock center 18, is adapted to support a work piece (not shown) to be turned on the lathe. The work piece is driven in the usual manner by a lathe dog and dog plate (not shown). Slidably mounted on the bed 14 for longitudinal movement therealong is a carriage 30 having a longitudinal power cylinder 32. Within the cylinder 32 is a stationary piston 34 supported substantially midway between the centers 18 and 28 by means of opposite piston rods 36 sealingly extending through opposite ends of the cylinder and appropriately secured to the opposite ends of the bed 14. The cylinder 32, piston 34, and rods 36 constitute a fluid motor 37 for moving the carriage 30.

The carriage 30 slidably supports a cross slide 38 which includes a power cylinder 40 (Figure 3) extending transversely of the bed 14. Disposed within the cylinder 40 is a piston 42 having opposite piston rods 44 sealingly extending through the opposite ends of the cylinder and connected to portions of the carriage 30 spaced transversely of the bed 14. The cylinder 40, piston 42, and rods 44 constitute a fluid motor 45 for moving the cross slide 38. On the front of the cross slide 38 is a pivotally mounted tool slide 46 which is operable by a hand wheel 48. The tool slide 46 conventionally carries a tool (not shown) for machining a work piece carried between the centers 18 and 28.

On the rear of the bed 14 and mounted adjacent each end thereof are a pair of arms 50 which extend upwardly above the cross slide 38 and support on their upper ends a template rail 52 extending over the cross slide and having a template holder 54 for supporting a profile template 56 substantially parallel to the work piece. On the rear of the cross slide 38 is a bracket 58 which carries a tracer mechanism 60 embodying this invention. The tracer mechanism includes a tracer valve 62 and a tracer finger 64 which is engageable with the template 56 to actuate the valve.

Hydraulic pressure fluid for operating the carriage and cross slide fluid motors 37 and 45 may be supplied from any suitable source. An appropriate source may be a unit 66 having a sump 68 on which is mounted an electric motor 70 driving a fixed displacement hydraulic pump 72, as shown in Figures 1 and 2. The unit 66 may also carry other of the hydraulic mechanisms used in a system embodying the present invention, such as the four flow dividers 74, 76, 78, and 80. These flow dividers are connected to the tracer valve 62 and to the fluid motors 37 and 45 by means of a plurality of extensible or flexible conduits, which are not illustrated in Figures 1 through 3 in order to lessen the complexity of such figures, but which are illustrated schematically in Figure 4 at 190, 192, 198, 200, 208, 210, 216, and 218.

Referring now to Figure 4, the pump 72 receives hydraulic fluid from the sump 68 through a conduit 82, preferably having a filter 84 interposed therein, and discharges the fluid, under high pressure, to the flow divider 74 via a conduit 86. Preferably the discharge conduit 86 has a safety pressure relief valve 88 connected thereto and vented to the sump 68 in order to protect the pump 72, and the hydraulic system, against excessive pressures. The flow divider 74 consists of two connected units 90 and 92, the first unit 90 serving to divide the flow from the conduit 86 into two flow streams, and the second unit 92 serving to maintain a constant ratio between the flow rates of the two streams.

The first unit 90 consists of a pair of simultaneously inversely adjustable hydraulic resistances 94 and 96. These resistances may be provided by a ported casing 98 having a sleeve 100 disposed therein and a spool 102 mounted for axial adjustment within the sleeve. The spool 102 has a pair of lands 104 and 106 of slightly less diameter than the interior of the sleeve 100 and separated by an annular groove 108 which receives fluid from the conduit 86 through an inlet port 110 extending through both the sleeve 100 and the casing 99. A pair of axially spaced interior circumferential grooves 112 and 114 in the sleeve 100 overlap the opposite ends of the lands 104 and 106, respectively, each groove being in communication with one of two separate outlet ports 116 and 118 extending through the sleeve and the casing 90. Hence, the unit 74 divides the flow from the conduit 86 into two streams, one flowing from the groove 108 through the restricted annular space between the land 104 and the sleeve 100 into the groove 112 and out of the outlet port 116, and the other flowing through the restricted annular space between the land 106 and the sleeve 100 into the groove 114 and out the outlet port 118. As will be seen, the restricted annular spaces between the spool lands and the sleeve constitute hydraulic resistances 94 and 96 in the paths of flow of the two streams.

Interposed between one end of the spool 102 and the casing 98 is a compression spring 120 while a screw 122 is threaded through the other end of the casing and bears against the corresponding end of the spool. The axial length, and hence the value of the hydraulic resistances 94 and 96 may be varied inversely by adjustment of the screw 122. When the pressures at the downstream side of the two flow restrictions 94 and 96 are equal, the flow rates in the two streams are inversely proportional to the hydraulic resistance values of the two restrictions.

The pressures on the downstream side of the hydraulic resistances 94 and 96 are maintained equal by the unit 92 which consists of a conventional type of mechanism including a casing 124 having a balance valve 126 therein forming pressure chambers 128 and 130 at the opposite ends of the valve, such chambers being connected to the outlet ports 116 and 118, respectively, of the unit 90. One end of the valve 126 has a tapered surface 132 cooperating with an edge of an interior circumferential groove 134 in the casing to provide a variable flow restriction 136 therebetween. Flow from the chamber 128 through the restriction 136 into the groove 134 is returned to the sump 68 via a conduit 138. The valve 126, which shifts to vary the restriction 136 in response to pressure differentials between the two chambers 128 and 130, operates in a known manner to maintain equal pressures at the downstream side of the hydraulic resistances 94 and 96 in the first unit 90, i. e. to maintain the pressure in chamber 128 equal to that in the chamber 130.

The purpose of the flow divider 74 will be explained hereinafter, but in this connection it will be apparent that the functions of the hydraulic resistances 94 and 96 may be accomplished by structurally different adjustable fluid resistances.

Power fluid for the operation of the hydraulic motors 37 and 45 is conducted from the chamber 130 of the unit 92, via a conduit 140, to the second flow divider 76 having two units 142 and 144, the functions of each of which are the same as those of the units 90 and 92 of the flow divider 74. The flow dividing unit 142 has, in this instance, a pair of fixed hydraulic resistances 146 and 148. These resistances 146 and 148 may be of any known type, but as shown are formed by a casing 150 having a fixed plug therein of less diameter, between its ends, than the interior of the casing and provided with lands 154 and 156 on each side of an inlet port 158 to provide the hydraulic resistances 146 and 148 in the form of restricted annular spaces between such lands and the interior of the casing. The two streams flowing from outlet ports 160 and 162 in the casing 150 on the opposite sides of the lands 154 and 156 are connected separately to the pressure chambers 164 and 166 of the flow-ratio-maintaining unit 144. This unit 144 has a casing 168 containing a balance valve 170 having two tapered ends 172 and 174 cooperating with the edges of corresponding casing grooves 176 and 178 to provide variable flow restrictions 180 and 182 therebetween.

This unit 144 functions in a manner similar to that of the unit 92 to maintain equal pressures at the downstream sides of the hydraulic resistances 180 and 182, i. e. in the chambers 164 and 166, so that the ratio of the two rates of flow through the resistances remains constant and inversely proportional to the values of the resistances. It readily will be seen that should the pressure in one chamber 164, or 166 increase above the pressure in the other, the balance valve 170 will slide to inversely vary the flow restrictions 180 and 182 in a direction which will equalize the pressures in the two chambers and thereby maintain a constant ratio between the flow rates of the two streams entering the unit 144. The ratio of the flow rates through the two outlet ports 184 and 186 of the unit 144 likewise remains constant.

The flow from the outlet port 186 of the unit 144 is conducted, via a conduit 188, to another two-unit flow divider 78 which is substantially the same as the flow divider 76. The two constant-flow-ratio fluid streams from the flow divider 78 are conducted, by conduits 190 and 192, to two inlet ports 194 and 196 of the tracer valve 62, while the two streams communicate with the cross slide motor 45, on opposite sides of the piston 42 therein, via conduits 198 and 200.

The flow from the other outlet port 184 of the unit 144 is conducted, by a conduit 202, to another two-unit flow divider 80 which performs the same functions as those of the flow divider 78, save that the hydraulic resistances in the flow dividing unit 204 are inversely adjustable. Hence, the unit 204 may be identical to the unit 90 and the purpose of making the hydraulic resistances adjustable will be described hereinafter. The flow-ratio-maintaining unit 206 is identical to the unit 144 and to the corresponding unit of the flow divider 78. The two fluid streams from the flow divider 80 are conducted, by conduits 208 and 210, to two more inlet ports 212 and 214 of the tracer valve 62, while these two streams communicate with the carriage motor 37, on opposite sides of the piston 34 therein, via conduits 216 and 218. The tracer valve 62 has three outlet ports 220, 222, and 224, the discharges from which are combined and conducted, by a return flow conduit 226, back to the sump 68.

The tracer valve 62 is of the spool type having a casing 228 providing a cylinder 230 therein. A sleeve 232 is snugly engaged within the cylinder 230 and a valve spool 234 is mounted for reciprocation within the sleeve. Interposed between the casing 228 and one end of the valve spool 234 is a compression coil spring 236, which constantly urges the valve spool in one direction, to the right as shown in Figure 4. The other end of the valve spool 234 is engaged by a ball 238 mounted for rectilinear movement in a cylindrical guide 240 and received in a recess 242 in one end of a tracer arm 244. The tracer arm 244 is supported for universal rocking movement, as by a ball and socket joint formed by a spherical enlargement 246 intermediate the ends of the arm 244 and cooperating with a complementary socket 248, and has the tracer finger 64 on the other end thereof. Both the ball guide 246 and the socket 248 may be formed in an integral member 250 which is secured to the valve casing 228. Obviously rocking movement of the tracer arm 244 from a non-deflected position moves the valve spool 234 to the left as shown in Figure 4.

From the construction illustrated, it will be seen that the spring 236 constantly urges the ball 238 to the right and into the recess 242 so that the tracer arm 244 is axially aligned with the valve spool 234, i. e. the tracer arm is urged into a normally non-deflected position. It likewise will be seen that when the tracer arm 244 is deflected to an extreme angularly deflected position, as by engagement of the finger 64 with a template, the valve spool 234 will be moved to an extreme far left position, as viewed in Figure 4. Intermediate these two positions of the valve spool 234, i. e. non-deflected and fully deflected positions, there is a position which, for convenience, is termed a central position. This central position of the valve spool 234, and of a corresponding position of the tracer arm 244, is illustrated in Figure 4.

The valve sleeve 232 is provided with six axially-spaced interior circumferential grooves 252, 254, 256, 258, 260, and 262, while the valve spool is provided with four axially-spaced lands alternating with three circumferential grooves 264, 266, and 268, each underlapping a pair of adjacent sleeve grooves, thus providing two variable annular restrictions to flow between each spool groove and its associated pair of sleeve grooves, i. e. six restrictions 270, 272, 274, 276, 278, and 280. In the central position of the spool shown in Figure 4, each spool groove underlaps its pair of sleeve grooves equally, so that the hydraulic resistances of the flow restrictions of each pair are equal. The inlet ports 194 and 196 communicate with the sleeve grooves 260 and 262, respectively, while the outlet port 224 communicates with the spool groove 268. The inlet port 214 communicates with the spool groove 266, while the outlet ports 220 and 222 communicate with the casing grooves 256 and 258, respectively. The inlet port 212 communicates with the casing groove 252, while the casing groove 254 communicates with the outlet port 220.

When the spool 234 is in central position, the resistances to flow 278 and 280 from the conduits 190 and 192 through the valve are equal and, hence, the pressures in the conduits 190 and 192 and on opposite sides of the motor piston 42 are equal. Therefore, the cylinder 40, and the cross slide 38 movable thereby, is stationary. If the deflection of the tracer arm 244 is lessened, i. e. it is moved toward its non-deflected position, the flow restriction 278 will narrow while the flow restriction 280 will widen. This variation of the flow restrictions 278 and 280 increases resistance to flow through the valve from conduit 190, and decreases resistance to flow through the valve from conduit 192, thus increasing the pressure in conduit 190 and lowering the pressure in conduit 192. This pressure differential across the motor piston 42 effects movement of the cross slide 38 to move the cutting tool toward the work, i. e. in an "in" direction.

Conversely, if the tracer arm 244 is deflected further from the central position shown in Fig. 4, a reversed pressure differential will be effected across the motor piston 42 to cause the cross slide 38 to move away from the work, i. e. in an "out" direction. Obviously, the degree of movement of the tracer arm 244 away from its central position is proportional to the value of the resulting pressure differential across the piston 42, so that the aforementioned degree of movement of the tracer arm directly controls the rate of movement of the cross slide 38, while the direction of movement of the tracer arm away from central position determines the direction of movement of the cross slide.

When the spool 234 is in central position, the hydraulic resistances of the two parallel arranged flow restrictions 274 and 276 are equal, so that the flow from the conduit 210 is divided equally therebetween for passage through the valve. In this position of the spool the resistance to flow through the valve from the conduit 210 is at a maximum. It will be seen, however, that when the tracer arm 244 is moved to effect movement of the valve spool 234 in either direction from central position, one of the restrictions 274 or 276 will narrow and the other will widen, to thus lower resistance to flow from the conduit 210.

Flow from the conduit 208 through the valve to the discharge port 220 passes in series through the flow restrictions 270 and 272. When the valve is in central position as shown in Figure 4, these two restrictions 270 and 272 are equal and the resistance to flow from the conduit 208 is at a minimum. Movement of the spool 234 in either direction away from central position, however, will narrow one or the other of the restrictions 270 and 272 and thus increase the resistance to flow from the conduit 208 through the valve. Further, the restrictions 270, 272 and 274, 276 are so proportioned that when the spool 234 is in central position the flow resistance from conduit 208 through the valve is less than the flow resistance from conduit 210 through the valve, thus effecting a pressure in conduit 210 higher than that in the conduit 208. The resulting pressure differential across the motor piston 34 causes movement of the carriage 30 at a maximum rate toward the headstock, or to the left as shown in Figure 1.

As the tracer arm 244 moves in either direction from its central position, with corresponding movement of the valve spool 234, the resistance to flow from conduit 208 increases while resistance to flow from conduit 210 decreases, thus decreasing the pressure differential across the piston 34 and slowing the movement of the carriage 30. As the tracer arm 244 approaches either its fully deflected or its non-deflected position, the resistances to flow from the two conduits 208 and 210 become equal to thereby equalize the pressures on opposite sides of the piston 34 and stop movement of the carriage 30. Continued movement of the tracer arm 244 to its fully deflected or its non-deflected position raises the resistance to flow from conduit 208 above the resistance to flow from conduit 210, thus reversing the aforedescribed pressure differentials across the piston 34 and causing movement of the carriage 30 toward the tailstock or to the right.

Referring now to the chart illustrated in Figure 5, it will be seen that a tool carried by the tool slide 46 can be moved in every desired direction on the lathe by pattern control. When the tracer finger 64 is not in contact with a template, the tracer valve is in non-deflected position with the result that the cross slide 38 moves "in" at maximum speed while at the same time moving right at a relatively slow speed, as shown in dotted lines in Figure 6. As the tracer finger 64 contacts the template 56 it may meet a template section which is parallel to the axis of the work piece, as shown at 282 in Figure 6. Contact of the finger 64 with this section 282 continues to shift the valve spool from its non-deflected position, thus slowing the "in" movement of the cross slide 38 while reversing the movement of the carriage 30, until the valve reaches its central position 282' (Figure 5) at which time movement of the cross slide ceases, i. e. the "in" and "out" movement of the cross slide is zero, and the carriage moves left at maximum speed. Hence, the tool shapes the work to the profile of the template section 282.

The response of the cross slide 38 and the carriage 30 to deflections of the tracer finger 64 is very sensitive and without appreciable time lag so that the work is shaped accurately without overrun in accordance with the template profile.

If the finger next encounters a template section 284 having a 45° taper, deflection of the finger lessens and the valve continues to shift back toward non-deflected position, to thus slow the speed of the carriage to the left and start an "in" movement of the cross slide, until the valve reaches a position 284' (Figure 5) where the speeds of the cross slide and the carriage become equal. Thus the tool moves at a 45° angle to the work.

If the finger next encounters a template section 286 having a 45° opposite taper, the finger is deflected through its central position 282' to a position 286', with an accompanying shifting of the valve to cause the cross slide to move out at a speed equal to the speed of the carriage in its continuing movement toward the left. A right shoulder 288 on the template 56 again lessens the deflection of the tracer finger from that assumed in tracing the template section 286, and shifts the valve to a position 288' wherein the slide moves in at near maximum speed, while the speed of the carriage is zero. A left shoulder section 290 deflects the tracer finger further from the central position 282', which it assumes in tracing the parallel straight section 292, until it reaches the position 290' where movement of the carriage ceases and the slide moves "out" at nearly maximum speed. A left undercut shoulder may be attained because the corresponding template section 294 deflects the tracer finger, even further from the position 290' assumed in forming a left shoulder, to the position 294', so that the carriage moves to the right as the cross slide moves "out." In forming a right undercut shoulder corresponding to the template section 296, the tracer finger assumes a substantially non-deflected position 296', so that the cross slide moves "in" as the carriage moves to the right.

Concavely and convexly curved contours may also be imparted to the work by corresponding template sections 298 and 300. Travel of the tracer finger along the concave section 298 causes a gradual shifting of the valve from its position 288', through its centered position 282' to its position 290'. Thus the "in" speed of the cross slide gradually decreases from near maximum to zero and then reverses to gradually attain a maximum outspeed, while the speed of the carriage towards the left increases from zero to maximum and back to zero to properly shape the work in accordance with the concavely curved template section 298.

Travel of the finger along the convex template section 300 gradually shifts the valve from its 290' position through its centered position 282' to its position 288'. Thus the "out" speed of the cross slide gradually decreases from near maximum to zero and then reverses to gradually attain a maximum "in" speed, while the speed of the carriage towards the left increases from zero to maximum and back to zero to shape the work in accordance with the convexly curved template section 300.

In controlling servomotors, and particularly servomotor driven components of a machine tool, regulation of the feed rates of the components is necessary. To this end the hydraulic resistances of the flow dividers 74 and 80 are made adjustable. It is readily apparent that if the rate of fluid flow in conduit 140 is regulated, the feed rates of both the cross slide and the carriage are regulated. This regulation may be attained by supplying the conduit 140 with pressure fluid from a variable displacement pump (not shown), or by discharging some of the output of the fixed displacement pump 72 to the sump 68 as is done by the flow divider 74. Hence, adjustment of the variable resistances 94 and 96 in the unit 90 simultaneously adjusts the feed rates of both the cross slide and the carriage. Similarly, the flow dividing unit 204 of the flow divider 80 is made adjustable so that the ratio of the flow rates in the conduits 208 and 210 may be adjusted in order to change the carriage feed rate without changing the cross slide feed rate.

The use of flow dividers in conjunction with a single pump, as disclosed herein, is preferable for economic reasons. It is clearly apparent, however, that separate pumps (not shown), preferably controllable for feed rate adjustment, may supply the necessary flow of fluid to the conduits 190, 192, 208 and 210, and thus render unnecessary all of the flow dividers 74, 76, 78, and 80.

It is apparent that the applicant has provided an improved method of tracer control and a structure for performing the method which not only is simple in construction and operation, but also is capable of providing undercut shoulders in either direction. Further, this capability enables the tool to cut any right-angled shoulder because the tracer mechanism will move the tool back to the precise desired position in spite of any overrun. These features have not been known heretofore in relatively simple hydraulic tracer circuits. It will be noted further that the extent of flow reversals is maintained at a minimum, occurring, in fact, only in the conduits 198, 200, 216, and 218 which connect the fluid motors 45 and 37 to the flow line pairs 190 and 192, and 208 and 210, and these conduits may be made relatively short.

It thus will be seen that the objects of this invention have been fully and effectively accomplished. It will be realized, however, that the specific embodiments of the invention illustrated and described to disclose the principles thereof may be changed in various respects without departing from such principles. For example, a different configuration could be imparted to the opposite ends of the cross slide motion "curve" or indicia line, shown in Figure 5, by providing a pair of additional circumferential grooves (not shown) in the spool 234 on opposite sides of the groove 268. Each of this pair of grooves would communicate with the return flow conduit 226 and would be spaced sufficiently from the groove 268 to slightly underlap the sleeve grooves 260 or 262 only when the spool approaches its non-deflected or fully deflected positions, respectively. Therefore, this invention includes all modifications which are encompassed within the spirit and scope of the following claims.

What is claimed is:

1. In a tracer valve the combination comprising: a valve casing having ports therein; a valve member mounted for movement in said casing and having land means thereon cooperating with said ports to define four flow paths through the valve and three pairs of variable flow restrictions associated with said paths, the resistances to flow of the restrictions of each of said pairs being inversely variable by movement of said valve member, the restrictions of a first of said pairs being interposed in a first and a second of said paths respectively, the restrictions of a second of said pairs being interposed in parallel in a third of said paths, and the restrictions of a third of said pairs being interposed in series in a fourth of said paths.

2. The structure defined in claim 1 in which the resistance to flow through the third path is greater than the resistance to flow through the fourth path when the valve member is in an intermediate position.

3. The structure defined in claim 2 in which the resistances to flow through the first and second paths are substantially equal when the valve member is in intermediate position.

4. In a pattern controlled device the combination comprising: a fluid pressure source; a flow divider connected to said source to provide first and second fluid streams; a second flow divider connected to said first stream to provide first and second fluid branches; a fluid motor connected between said branches; and a tracer valve connected to said branches to control the flow from each said branch.

5. The structure defined in claim 4 in which the second flow divider is adjustable to vary the flow rate ratio of said branches.

6. In a pattern controlled machine tool the combination comprising: a fluid pressure source; flow dividing means connected to said source to provide a first, a second, a third, and a fourth flow branch and for maintaining substantially constant flow rate ratios between said branches; a first fluid motor connected between said first and second branches; a second fluid motor connected between said third and fourth branches; and a tracer valve connected to all of said branches to control the flow from each said branch.

7. The structure defined in claim 6 in which the flow dividing means is adjustable to vary the flow rate ratio between the first and second flow branches.

8. In a pattern controlled machine tool the combination comprising: a fluid pressure source; a first flow dividing means connected to said source for providing first and second flow streams; a second flow dividing means connected to said first stream for providing first and second flow branches; a fluid motor connected between said first and second branches; a third flow dividing means connected to said second stream for providing third and fourth flow branches; a fluid motor connected between said third and fourth branches; and a tracer valve connected to all of said branches for controlling the discharge from each said branch.

9. In a hydraulic servomotor system the combination comprising: a pair of fluid pressure sources; a fluid motor connected between said sources; a pair of variable fluid resistances connected in parallel to one of said sources for fluid discharge therethrough; a second pair of variable fluid resistances connected in series to the other of said sources for fluid discharge therethrough; and means for simultaneously inversely varying the resistances of each of said pairs in order to control the speed and direction of said motor.

10. In a hydraulic servomotor system the combination comprising: a pair of flow lines; means for feeding said lines with fluid under pressure and for maintaining a substantially constant flow rate ratio therebetween; a fluid motor connected between said lines for operation by pressure differentials therebetween; and a tracer valve connected to said lines for controlling the discharge from each thereof and thereby the pressure therein to control the speed and direction of said motor, said valve having a non-deflected, a central, and a fully deflected position and providing two variable resistance discharge flow paths through said valve, one connected to one of said lines and the other connected to the other of said lines, the resistance of one of said paths progressively increasing on movement of said valve in either direction from said central position, and the resistance of the other of said paths progressively decreasing on movement of said valve in either direction from said central position.

11. In a hydraulic servomotor system the combination comprising: two pairs of flow lines; means for feeding all of said lines with fluid under pressure and for maintaining a substantially constant flow rate ratio between the lines of each of said pairs; a first fluid motor connected between the lines of one of said pairs for operation by pressure differentials therebetween; a second fluid motor connected between the lines of the other of said pairs for operation by pressure differentials therebetween; and a tracer valve connected to all of said lines for controlling the discharge from each thereof and thereby the pressure therein to control the speed and direction of said motors, said valve including a casing having ports opening to an interior valve chamber and a movable valve member within said chamber having a non-deflected, a central, and a fully deflected position and said valve member having land means thereon cooperating with certain groups of said ports to define four infinitely variable resistance discharge flow paths through said valve, the resistance of a first of said paths progressively increasing as said member moves from non-deflected to fully-deflected position, the resistance of a second of said paths progressively decreasing as said member moves from non-deflected to fully-deflected position, the resistance of a third of said paths progressively increasing as said member moves in either direction from central position, and the resistance of a fourth of said paths progressively decreasing as said member moves in either direction from central position, the lines of one of said pairs being connected, respectively, to said first and second paths and the lines of the other of said pairs being connected, respectively, to said third and fourth paths.

12. In a hydraulic servomotor system the combination comprising: a pair of flow lines; means for feeding said lines with fluid under pressure and for maintaining a substantially constant flow rate ratio therebetween; a fluid motor connected between said lines for operation by pressure differentials therebetween; and a tracer valve connected to said lines for controlling the discharge from each thereof and thereby the pressure therein to control the speed and direction of said motor, said valve including a casing having ports therein opening to an interior valve chamber and a movable valve member within said chamber having a non-deflected, a central, and a fully-deflected position, said valve member having a first land means cooperative with certain of said casing ports to define a first infinitely variable resistance flow path through said valve connected to one of said lines and having a greater resistance when said valve member is in said central position than when in said non-deflected position, and a smaller resistance when said valve member is in said fully-deflected position than when in said central position, and said valve member having second land means cooperative with certain other of said casing ports to define a second infinitely variable resistance flow path through said valve connected to the other of said lines and having a smaller resistance when said valve member is in said central position than when in said non-deflected position and a greater resistance when said valve member is in said fully-deflected position than when in said central position.

13. The structure defined in claim 12 including means constantly urging the valve member toward the non-deflected position, and a tracer arm connected to the valve for movement of said valve member from said non-deflected position by deflection of said arm.

14. In a hydraulic servomotor system the combination comprising: a pair of flow lines; means for feeding said lines with fluid under pressure and for maintaining a substantially constant flow rate ratio therebetween; a fluid motor connected between said lines for operation by pressure differentials therebetween; and a tracer valve connected to said lines for controlling the discharge from each thereof and thereby the pressure therein to control the speed and direction of said motor, said valve including a casing having ports therein opening into an interior valve chamber and a movable valve member within said chamber having a non-deflected, a central, and a fully-deflected position, said valve member having first land means cooperative with certain of said casing ports to define a first infinitely variable resistance flow path through the valve connected to one of said lines and having a greater resistance when said valve member is in said fully deflected position than when in said non-deflected position, and said valve member having second land means cooperative with certain other of said casing ports to define a second infinitely variable resistance flow path through said valve connected to the other of said lines and having a smaller resistance when said valve member is in said fully-deflected position than when in said non-deflected position.

15. The structure defined in claim 14, including means constantly urging the valve member toward the non-deflected position, and a tracer arm connected to said valve for movement of said valve member from said non-deflected position by deflection of said arm.

16. In a hydraulic servomotor system the combination comprising: two pairs of flow lines; means for feeding all of said lines of fluid under pressure and for maintaining a substantially constant flow rate ratio between the lines of each of said pairs; a first fluid motor connected between the lines of one of said pairs for operation by pressure differentials therebetween; a second fluid motor connected between the lines of the other of said pairs for operation by pressure differentials therebetween; and a tracer valve connected to all of said lines for controlling the discharge from each thereof and thereby the pressure therein to control the speed and direction of said motors, said valve including a casing having ports therein opening to an interior valve chamber and a movable valve member within said chamber having a non-deflected, a central, and a fully-deflected position, said valve member having first land means cooperative with certain of said casing ports to define a first infinitely variable resistance flow path through said valve having a greater resistance when said valve member is in said fully-deflected position than when in said non-deflected position, said valve member having second land means cooperative with certain other of said casing ports to define a second infinitely variable resistance flow path through said valve having smaller resistance when said valve member is in said fully-deflected position than when in said non-deflected position, said valve member having a third land means cooperative with certain other of said casing ports to define a third infinitely variable resistance flow path through said valve having a greater resistance when said valve member is in said central position than when in said non-deflected position, and a smaller resistance when said valve member is in said fully-deflected position than when in said central position, and said member having fourth land means cooperative with said other of said casing ports to define a fourth infinitely variable resistance flow path through said valve having a smaller resistance when said valve member is in said central position than when in said non-deflected position, and a greater resistance when said valve member is in said fully-deflected position than when in said central position, the lines of one of said pairs being connected, respectively, to said first and second paths and the lines of the other of said pairs being connected, respectively, to said third and fourth paths.

17. The structure defined in claim 16 including means constantly urging the valve member toward the non-deflected position, and a tracer arm connected to the valve for movement of said valve member from said non-deflected position by deflection of said arm.

References Cited in the file of this patent

UNITED STATES PATENTS

| | | |
|---|---|---|
| 1,890,041 | McLeod | Dec. 6, 1932 |
| 1,999,834 | Ernst | Apr. 30, 1935 |
| 2,003,557 | Sassen | June 4, 1935 |
| 2,083,774 | Campbell | June 15, 1937 |
| 2,105,198 | McNamara | Jan. 11, 1938 |
| 2,242,002 | Klein | May 13, 1941 |
| 2,331,817 | Turchan | Oct. 12, 1943 |
| 2,380,357 | Ziebolz | July 10, 1945 |
| 2,391,492 | Turchan et al. | Dec. 25, 1945 |
| 2,412,549 | Yates | Dec. 10, 1946 |
| 2,432,502 | Bentley et al. | Dec. 16, 1947 |
| 2,597,050 | Audemar | May 20, 1952 |
| 2,602,437 | Tancred | July 8, 1952 |
| 2,612,184 | Evans | Sept. 30, 1952 |
| 2,726,581 | Roehm | Dec. 13, 1955 |

OTHER REFERENCES

Ser. No. 366,364, Wünsch et al. (A. P. C.), published April 27, 1943.